US009088716B2

(12) United States Patent
Khan et al.

(10) Patent No.: US 9,088,716 B2
(45) Date of Patent: Jul. 21, 2015

(54) METHODS AND APPARATUS FOR IMAGE PROCESSING IN WIRELESS CAPSULE ENDOSCOPY

(75) Inventors: Tareq Hasan Khan, Saskatoon (CA); Khan Arif Wahid, Saskktoon (CA)

(73) Assignee: The University of Saskatchewan, Saskatoon, SK (CA)

( * ) Notice: Subject to any disclaimer, the term of this patent is extended or adjusted under 35 U.S.C. 154(b) by 578 days.

(21) Appl. No.: 13/444,222

(22) Filed: Apr. 11, 2012

(65) Prior Publication Data

US 2013/0271585 A1 Oct. 17, 2013

(51) Int. Cl.
*H04N 7/18* (2006.01)
*H04N 5/232* (2006.01)
*H04N 9/04* (2006.01)
*H04N 5/225* (2006.01)

(52) U.S. Cl.
CPC .......... *H04N 5/23241* (2013.01); *H04N 9/045* (2013.01); *H04N 7/18* (2013.01); *H04N 2005/2255* (2013.01)

(58) Field of Classification Search
CPC ........ A61B 1/041; A61B 5/07; H04N 5/2256; H04N 5/2354; H04N 9/04; H04N 2005/22555; G02B 23/243
See application file for complete search history.

(56) References Cited

U.S. PATENT DOCUMENTS

2006/0178565 A1* 8/2006 Matsui et al. ................. 600/160
2010/0238278 A1* 9/2010 Rovegno ......................... 348/75

OTHER PUBLICATIONS

T.H. Khan and K. Wahid, 'Low-complexity colour-space for capsule endoscopy image compression,' Electronics Letters, Oct. 27, 2011, vol. 47 No. 22, pp. 1217-1218.
Song, L., et al.: 'Narrow band imaging and multiband imaging', Gastrointestinal Endoscopy, 2008, 67, (4), pp. 581-589.
Malvar, H.S., Sullivan, G.J., and Srinivasan, S.: 'Lifting-based reversible color transformations for image compression'. Proc. SPIE Applications of Digital Image Processing XXXI, San Diego, CA, USA, 2008, vol. 7073, p. 707307.1-707307.10.
Khan, T.H., and Wahid, K.: 'Subsample-based image compression for capsule endoscopy', J. Real-Time Image Process., 2011 (doi: 10.1007/s11554-011-0208-7).
Chen, X., et al.: 'A wireless capsule endoscope system with low power controlling and processing ASIC', IEEE Trans. Biomed. Circuits Syst., 2009, 3, (1), pp. 11-22.
Khan, T.H., and Wahid, K.: 'Lossless and low power image compressor for wireless capsule endoscopy', VLSI Design, 2011 (Article ID 343787, 2011).
Tareq Hasan Khan, and Khan A. Wahid, 'Low Power and Low Complexity Compressor for Video Capsule Endoscopy', IEEE Trans. Circuits and Systems for Video Technology, vol. 21, No. 10, Oct. 2011, pp. 1534-1546.
X. Chen, X. Zhang, L. Zhang, X. Li, N. Qi, H. Jiang, and Z. Wang, "A wireless capsule endoscope system with low power controlling and processing ASIC," IEEE Trans. Biomed. Circuits Syst., vol. 3, No. 1, pp. 11-22, Feb. 2009.

(Continued)

*Primary Examiner* — Huy T Nguyen
(74) *Attorney, Agent, or Firm* — Duane Morris LLP

(57) ABSTRACT

Methods and apparatus for image processing suitable for use in wireless capsule endoscopy are provided. The image processing techniques exploit characteristic features of endoscopic images to enable low complexity compression. A color space conversion, coupled with lossless predictive coding and variable length coding are employed. Sub-sampling and clipping may also be used. The described image processing can be used both with both white-band imaging and narrow-band-imaging.

20 Claims, 13 Drawing Sheets

(56) References Cited

OTHER PUBLICATIONS

X. Xie, L. Guolin, C. Xinkai, L. Xiaowen, and Z. Wang, "A low-power digital IC design inside the wireless endoscopic capsule," IEEE J. Solid-State Circuits, vol. 41, No. 11, pp. 2390-2400, Nov. 2006.

P. Turcza and M. Duplaga, "Low-power image compression for wireless capsule endoscopy," in Proc. IEEE Int. Workshop Imag. Syst. Tech., May 2007, pp. 1-4.

M. Lin, L. Dung, and P. Weng, "An ultra-low-power image compressor for capsule endoscope," Biomed. Eng. Online, vol. 5, No. 14, pp. 1-8, 2006.

J. Ziv and A. Lempel, "A universal algorithm for sequential data compression," IEEE Trans. Inform. Theory, vol. 23, No. 3, pp. 337-343, May 1977.

S. Rigler, W. Bishop, and A. Kennings, "FPGA-based lossless data compression using Huffman and LZ77 algorithms," in Proc. IEEE Canad. Conf. Electric. Comput. Eng., Apr. 2007, pp. 1235-1238.

R. Tajallipour and K. Wahid, "Efficient data encoder for low-power capsule endoscopy application," in Proc. Int. Conf. Inform. Sci. Signal Process. Their Applicat., 2010, pp. 512-515.

N. Bourbakis, G. Giakos, and A. Karargyris, "Design of new-generation robotic capsules for therapeutic and diagnostic endoscopy," in Proc. IEEE Int. Conf. Imag. Syst. Tech., Jul. 2010, pp. 1-6.

J. Wu and Y. Li, "Low-complexity video compression for capsule endoscope based on compressed sensing theory," in Proc. Int. Conf. IEEE Eng. Med. Biol. Soc., Sep. 2009, pp. 3727-3730.

M. Meng, T. Mei, J. Pu, C. Hu, X. Wang, and Y. Chan, "Wireless robotic capsule endoscopy: State-of-the-art and challenges," in Proc. World Congr. Intell. Contr. Automat., vol. 6. 2004, pp. 5561-5565.

S. Hosseini and M. Khamesee, "Design and control of a magnetically driven capsule-robot for endoscopy and drug delivery," in Proc. IEEE Toronto Int. Conf. Sci. Technol. Humanity, Sep. 2009, pp. 697-702.

O. Alonso, L. Freixas, and A. Dieguez, "Advancing towards smart endoscopy with specific electronics to enable locomotion and focusing capabilities in a wireless endoscopic capsule robot," in Proc. IEEE Biomed. Circuits Syst. Conf., Nov. 2009, pp. 213-216.

D. Turgis and R. Puers, "Image compression in video radio transmission for capsule endoscopy," Elsevier Sensors Actuators A, vols. 123-124, pp. 129-136, Sep. 2005.

Pillcam, Given Imaging (retrieved online): http://www.givenimaging.com/en-us/HealthCareProfessionals/Pages/CapsuleEndoscopy.aspx.

C. McCaffrey, O. Chevalerias, C. O'Mathuna, and K. Twomey, "Swallowable-capsule technology," IEEE Pervasive Comput., vol. 7, No. 1, pp. 23-29, Jan.-Mar. 2008.

A. Moglia, A. Menciassi, and P. Dario, "Recent patents on wireless capsule endoscopy," Recent Patents Biomed. Eng., vol. 1, No. 1, pp. 24-33, 2008.

Zarlink Semiconductor. (2011). ZL70101 MICS Transceiver (retrieved online): http://www.zarlink.com/zarlink/hs/82_ZL70101.htm.

D. Salomon, Data Compression: The Complete Reference, 3rd ed. New York: Springer-Verlag, 2004.

S. Golomb, "Run-length encodings," IEEE Trans. Inform. Theory, vol. 12, No. 3, pp. 399-401, Jul. 1966.

D. Maroulis, D. Iakovidis, A. Karkanis, and D. Karras, "CoLD: A versatile detection system for colorectal lesions in endoscopy video frames," Comput. Methods Programs Biomed., vol. 70, No. 2, pp. 151-166, Feb. 2003.

M. Weinberger, G. Seroussi, and G. Sapiro, "The LOCO-I lossless image compression algorithm: Principles and standardization into JPEGLS," IEEE Trans. Image Process., vol. 9, No. 8, pp. 1309-1324, Aug. 2000.

M. Meira, J. Lima, and L. Batista, "An FPGA impementation of a lossless electrocardiogram compressor based on prediction and Golomb-Rice coding," in Proc. V Workshop de Informática Médica, 2005.

A. Savakis and M. Piorun, "Benchmarking and hardware implementation of JPEG-LS," in Proc. Int. Conf. Image Process., vol. 2. 2002, pp. 949-952.

M. Papadonikolakis, V. Pantazis, and A. Kakarountas, "Efficient high performance ASIC implementation of JPEG-LS encoder," in Proc. Des., Automat. Test Europe Conf. Expo., 2007, pp. 1-6.

G. Iddan, G. Meron, A. Glukhovsky, and P. Swain, "Wireless capsule endoscopy," Nature, vol. 405, p. 417, May 2000.

Z. Wang, A. C. Bovik, H. R. Sheikh, and E. P. Simoncelli, "Image quality assessment: From error visibility to structural similarity," IEEE Trans. Image Process., vol. 13, No. 4, pp. 600-612, Apr. 2004.

F. Gong, P. Swain, and T. Mills, "Wireless endoscopy," Gastrointest. Endoscopy, vol. 51, No. 6, pp. 725-729, Jun. 2000.

Z. Wang and A. C. Bovik, "Mean squared error: Love it or leave it?" IEEE Signal Process. Mag., vol. 26, No. 1, pp. 98-117, Jan. 2009.

R. Istepanian, N. Philip, M. Martini, N. Amso, and P. Shorvon, "Subjective and objective quality assessment in wireless teleultrasonography imaging," in Proc. Int. Conf. IEEE Eng. Med. Biol. Soc., Aug. 2008, pp. 5346-5349.

S. S. Young, "Alias-free image subsampling using Fourier-based windowing methods," Optic. Eng., vol. 43, No. 4, pp. 843-855, 2004.

D. O. Faigel and D. R. Cave, Capsule Endoscopy. New York: Saunders Elsevier, 2008.

J. P. Cunha, M. Coimbra, P. Campos, and J. M. Soares, "Automated topographic segmentation and transit time estimation in endoscopic capsule exams," IEEE Trans. Med. Imag., vol. 27, No. 1, pp. 19-27, Jan. 2008.

Toshiba TCM8230MD Image Sensor. (2011) (retrieved online): http://www.sparkfun.com/products/8667.

Aptina MT9V011 Image Sensor Data Sheet.

T. Khan and K. Wahid, "A DVP-based bridge architecture to randomly access pixels of high speed image sensors," EURASIP J. Embedded Syst., vol. 2011, No. 270908, pp. 1-13, 2011.

M. Navas, "Capsule endoscopy," World J. Gastroenterol., vol. 15, No. 13, pp. 1584-1586, 2009.

A. Kolar, O. Romain, J. Ayoub, S. Viateur, and B. Granado, "Prototype of video endoscopic capsule with 3-D imaging capabilities," IEEE Trans. Biomed. Ciruits Syst., vol. 4, No. 4, pp. 239-249, Aug. 2010.

FCC Rules and Regulations 47 CFR Part 95, Subparts E (95.601-95.673) and I (95.1201-95.1219), Personal Radio Services, Nov. 2002.

Y. Chan, M. Q.-H. Meng, X. Wang, and J. C. Y. Wu, "A prototype design of a wireless capsule endoscope," Appl. Bionics Biomech., vol. 3, No. 4, pp. 253-262, 2006.

J. Li and Y. Deng, "Fast compression algorithms for capsule endoscope images," in Proc. Int. Congr. Image Signal Process., 2009, pp. 1-4.

Alliance Memory Inc. 256k×8 Bit Low Power CMOS SRAM (AS6C2008).

A. Karargyris and N. Bourbakis, "Wireless capsule endoscopy and endoscopic imaging: A survey on various methodologies presented," IEEE Eng. Med. Biol. Mag., vol. 29, No. 1, pp. 72-83, Jan.-Feb. 2010.

Z. Fireman and Y. Kopelman, "New frontiers in capsule endoscopy," J. Gastroenterol. Hepatol.: Rev., vol. 22, No. 8, pp. 1174-1177, 2007.

T. Fawcett, "An introduction to ROC analysis," Patt. Recog. Lett., vol. 27, No. 8, pp. 861-874, Jun. 2006.

H. R. Sheikh and A. C. Bovik, "Image information and visual quality," IEEE Trans. Image Process., vol. 15, No. 2, pp. 430-444, Feb. 2006.

D. M. Chandler and S. S. Hemami, "VSNR: A wavelet-based visual signal-to-noise ratio for natural images," IEEE Trans. Image Process., vol. 16, No. 9, pp. 2284-2298, Sep. 2007.

E. A. Krupinski, "Current perspectives in medical image perception," Attent., Percept., Psychophys., vol. 72, No. 5, pp. 1205-1217, 2010.

R. Bourne, Fundamentals of Digital Imaging in Medicine. London, U.K.: Springer-Verlag, 2010, pp. 87-107.

A. Pezzoli, R. Cannizzaro, M. Pennazio, E. Rondonotti, L. Zancanella, N. Fusetti, M. Simoni, F. Cantoni, R. Melina, A. Alberani, G. Caravelli, F. Villa, F. Chilovi, T. Casetti, G. Iaquinto, N. D'imperio, and S. Gullini, "Interobserver agreement in describing video capsule endoscopy findings: A multicentre prospective study," Dig. Liver Disease, vol. 43, No. 2, pp. 126-131, Feb. 2011.

(56) References Cited

OTHER PUBLICATIONS

D. J. Costello, J. Hagenauer, H. Imai, and S. B. Wicker, "Applications of error-control coding," IEEE Transactions of Information Theory, vol. 44, No. 6, pp. 2531-2560, 1998.

Mackiewicz, M., Berens, J., Fisher, M.: Wireless capsule endoscopy color video segmentation. IEEE Trans Med Imag 27(12), 1769-1781 (2008).

P. Swain, "The future of wireless capsule endoscopy," World Journal of Gastroenterology, vol. 14, No. 26, pp. 4142-4145, 2008.

OmniVision OVM7690 camera cube, http://www.ovt.com/products/sensor.php?id=45.

Aptina MT9V131 image sensor, 2010.

K. Wahid, S. B. Ko, and D. Teng, "Efficient hardware implementation of an image compressor for wireless capsule endoscopy applications," in Proceedings of the International Joint Conference on Neural Networks, pp. 2761-2765, Jun. 2008.

Bourbakis, N., Giakos, G., Karargyris, A.: Design of new-generation robotic capsules for therapeutic and diagnostic endoscopy. In: Proceedings of the IEEE International Conference on Imaging Systems and Techniques, pp. 1-6 (2010).

T. daSilva, C. Diniz, J. Vortmann, L. Agostini, A. Susin, and S. Bampi, "A pipelined 8×8 2-D forward DCT hardware architecture for H.264/AVC high profile encoder," in Proceedings of the 2nd Pacific Rim Conference on Advances in Image and Video Technology, pp. 5-15, Santiago, Chile, 2007.

T. Khan and K. Wahid, "Design of a DVP compatible bridge to randomly access pixels of high speed image sensors," in Proceedings of the IEEE International Conference on Consumer Electronics, pp. 911-912, 2011.

M. Quirini, A. Menciassi, C. Stefanini, S. Gorini, G. Pernorio, and P. Dario, "Development of a legged capsule for the gastrointestinal tract: an experimental set-up," in Proceedings of the IEEE International Conference on Robotics and Biomimetics, pp. 161-167, Jul. 2005.

JPEG-LS public domain code, 2010, http://www.stat.columbia.edu/~jakulin/jpeg-ls/mirror.htm.

C. Hu, M. Meng, L. Liu, Y. Pan, and Z. Liu, "Image representation and compression for capsule endoscope robot," in Proceedings of the IEEE International Conference on Information and Automation, pp. 506-511, Jun. 2009.

L. R. Dung, Y. Y. Wu, H. C. Lai, and P. K. Weng, "A modified H.264 Intra-frame video encoder for capsule endoscope," in Proceedings of the IEEE Biomedical Circuits and Systems Conference (BIOCAS '08), pp. 61-64, Nov. 2008.

Cosman, P., Gray, R., Olshen, R., Evaluating Quality of Compressed Medical Images: SNR, Subjective Rating, and Diagnostic Accuracy. In: Proceedings of the IEEE, vol. 82, No. 6, pp. 919-932 (1994).

Salomon, D.: Data compression: the complete reference, 3rd edn. Springer, Berlin (2004).

Cho, N., Lee, S.: Fast algorithm and implementation of 2-D discrete cosine transform. IEEE Trans Circuit Syst 38(3), 297-305 (1991).

J. L. Toennies, G. Tortora, M. Simi, P. Valdastri, and R. J. Webster, "Swallowable medical devices for diagnosis and surgery: the state of the art," Proc. IMechE vol. 224 Part C: J. Mechanical Engineering Science, doi:10.1243/09544062JMES1879, pp. 1397-1414, 2009.

C.E. Shannon, "A mathematical theory of communication," Bell Syst. Tech. J., vol. 27, pp. 379-423, 1948.

S. Danese, et al., "Narrow-band imaging endoscopy to assess mucosal angiogenesis in inflammatory bowel disease: A pilot study," World J Gastroenterol, vol. 16, issue: 19, pp. 2396-2400, 2010.

L. Dung and Y. Wu, "A wireless narrowband imaging chip for capsule endoscope," IEEE Transactions on Biomedical Circuits and Systems, vol. 4, No. 6, pp. 462-468, 2010.

K. Seshadrinathan, R. Soundararajan, A.C. Bovik, and L.K. Cormack, "Study of subjective and objective quality assessment of video," IEEE Trans. on Image Processing, 19, No. 6, pp. 1427-1441, 2010.

G. Chan, "Towards better chroma subsampling," SMPTE Motion Imaging Journal, May/June, pp. 39-45, 2008.

L. Pillai, "Video compression using DCT," Xilinx Application Note: Virtex-II Series, 2002.

M. Lin and L. Dung, "A subsample-based low-power image compressor for capsule gastrointestinal endoscopy," EURASIP Journal on Advances in Signal Processing, vol. 2011, Article ID 257095, 2011.

Olympus eNews, Envision winter 2008.

K. Holm, and O. Gustafsson, "Low-complexity and low-power color space conversion for digital video," In Proc. IEEE Norchip Conference, pp. 179-182, doi: 10.1109/NORCHP.2006.329205, 2006.

C. Cavallotti, P. Merlino, M. Vatteroni, P. Valdastri, A. Abramo, A. Menciassi, and P. Dario, "An FPGA-based versatile development system for endoscopic capsule design optimization," Sensors and Actuators A: Physical, vol. 172, pp. 301-307, Jan. 31, 2011.

D. Covi, C. Cavallotti, M. Vatteroni, L. Clementel, P. Valdastri, A. Menciassi, P. Dario, and A. Sartori, "Miniaturized digital camera system for disposable endoscopic applications", Sensors and Actuators A, vol. 162, pp. 291-296, Mar. 30, 2010.

C. Cavallotti, M. Piccigallo, E. Susilo, P. Valdastri, A. Menciassi, and P. Dario, "An integrated vision system with autofocus for wireless capsular endoscopy," Sensors and Actuators A, vol. 156, pp. 72-78, Mar. 9, 2009.

Y. Chan, M. Q.-H Meng and X. Wang, "A Prototype Design of Wireless Capsule Endoscope", Department of Electrical Engineering, Chinese university of Hong Kong, pp. 400.

\* cited by examiner

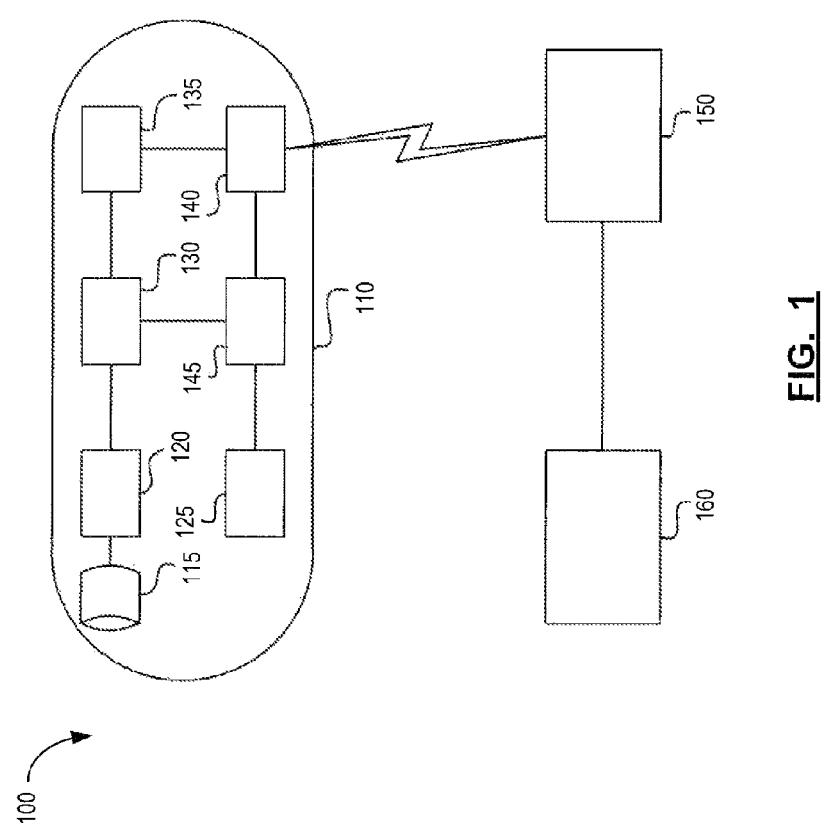

METHODS AND APPARATUS FOR IMAGE PROCESSING IN WIRELESS CAPSULE ENDOSCOPY

FIELD

The described embodiments relate to methods and apparatus for image processing and, in particular, to image processing suitable for use in images having a dominant color, such as those produced in wireless capsule-based endoscopy.

BACKGROUND

In the United States alone, over 3 million people suffer from gastrointestinal (GI) diseases annually. The cause of these diseases can be difficult to diagnose, and is never found in over one-third of cases. Endoscopy is a significant medical diagnostic technique that can assist in detecting the cause of GI disease, however conventional endoscopy involves traversing portions of the GI tract with a wired device, which can be uncomfortable and unpleasant for the patient.

SUMMARY

In a first broad aspect, there is provided a method of processing an image captured using a color image sensor, the image comprising a plurality of samples in a plurality of color channels, the method comprising: generating a luma channel based on the plurality of color channels; generating a first chroma channel based on a difference between the luma channel and a first color channel in the plurality of color channels; generating a second chroma channel based on a difference between the luma channel and a second color channel in the plurality of color channels; generating, using a processor, a plurality of predicted sample values for the luma channel and the first and second chroma channels using a lossless predictive coding mode; computing a plurality of difference values between the plurality of predicted sample values and the respective generated sample values; and variable length coding the plurality of difference values to produce a processed image.

Each sample value of the luma channel may be generatable using (e.g., generated using only) addition and shift operations. Each sample value of the first and second chroma channels may be generatable using (e.g., generated using only) addition, negation and shift operations.

Each sample value of the luma channel may be generated based on a summation of corresponding sample values in the plurality of color channels. The summation may be of: a first color channel sample value bitshifted once to divide by two; a second color channel sample value bitshifted twice to divide by four; and a remaining color channel sample value bitshifted twice to divide by four.

The difference between the luma channel and the first color channel may be computed based on: the luma sample value bitshifted once to divide by two; and the first color channel sample value bitshifted once to divide by two.

The difference between the luma channel and the second color channel may be computed by: computing a sum of the first color channel sample value and the remaining color channel sample value, bitshifting the sum three times to divide by eight, and subtracting from the bitshifted sum the second color channel sample value bitshifted twice to divide by four.

The image may comprise a dominant color, and the first and second color channels may correspond to colors other than the dominant color.

The color image sensor may be an RGB sensor, and the first color channel may be a green color channel and the second color channel may be a blue color channel.

The method may further comprise subsampling the first chroma channel relative to the luma channel prior to generating the plurality of predicted sample values.

The method may further comprise subsampling the second chroma channel relative to the luma channel prior to generating the plurality of predicted sample values.

The method may further comprise clipping at least one portion of the image prior to generating the plurality of predicted sample values.

The lossless predictive coding mode may be a JPEG lossless predictive coding mode. The JPEG lossless predictive coding mode may be left pixel prediction.

The plurality of difference values may be variable length coded using Golomb-Rice coding.

In another broad aspect, there is provided a method of generating an endoscopic image for wireless transmission, the method comprising: illuminating a diagnostic area using at least one light source; capturing, using a color image sensor, an image of the diagnostic area under illumination, the image comprising a plurality of samples in a plurality of color channels; and processing the image according to the described methods to produce the endoscopic image for wireless transmission.

The diagnostic area may be illuminated with a wide spectrum light source or at least one narrow band light source.

The at least one light source may comprise a wide spectrum light source and at least one narrow band light source, and the method may further comprise switching between the wide spectrum light source and the at least one narrow band light source.

The at least one light source may comprise a wide spectrum light source, and the method may further comprise switching between a wide spectrum imaging mode and a narrow band imaging mode.

The at least one narrow band light source may comprise a green light source or a blue light source.

In another broad aspect, there is provided an apparatus for processing an image captured using a color image sensor, the image comprising a plurality of samples in a plurality of color channels, the apparatus comprising: a color conversion module configured to: generate a luma channel based on the plurality of color channels; generate a first chroma channel based on a difference between the luma channel and a first color channel in the plurality of color channels; and generate a second chroma channel based on a difference between the luma channel and a second color channel in the plurality of color channels; a predictive encoder configured to: generate a plurality of predicted sample values for the luma channel and the first and second chroma channels using a lossless predictive coding mode; and compute a plurality of difference values between the plurality of predicted sample values and the respective generated sample values; and a variable length coder configured to encode the plurality of difference values to produce a processed image.

Each sample value of the luma channel may be generatable using (e.g., generated using only) addition and shift operations. Each sample value of the first and second chroma channels may be generatable using (e.g., generated using only) addition, negation and shift operations.

Each sample value of the luma channel may be generated based on a summation of corresponding sample values in the plurality of color channels. The summation may be of: a first color channel sample value bitshifted once to divide by two; a second color channel sample value bitshifted twice to divide by four; and a remaining color channel sample value bitshifted twice to divide by four.

The difference between the luma channel and the first color channel may be computed based on: the luma sample value bitshifted once to divide by two; and the first color channel sample value bitshifted once to divide by two.

The difference between the luma channel and the second color channel may be computed by: computing a sum of the first color channel sample value and the remaining color channel sample value, bitshifting the sum three times to divide by eight, and subtracting from the bitshifted sum the second color channel sample value bitshifted twice to divide by four.

The image may comprise a dominant color, and the first and second color channels may correspond to colors other than the dominant color.

The color image sensor may be an RGB sensor, and the first color channel may be a green color channel and the second color channel may be a blue color channel.

The apparatus may further comprise a subsampler configured to subsample the first chroma channel relative to the luma channel prior to generating the plurality of predicted sample values.

The subsampler may be configured to subsample the second chroma channel relative to the luma channel prior to generating the plurality of predicted sample values.

The apparatus may further comprise a clipper configured to clip at least one portion of the image prior to generating the plurality of predicted sample values.

The lossless predictive coding mode may be a JPEG lossless predictive coding mode. The JPEG lossless predictive coding mode may be left pixel prediction.

The plurality of difference values may be variable length coded using Golomb-Rice coding.

In another broad aspect, there is provided an apparatus for generating an endoscopic image for wireless transmission, the apparatus comprising: at least one light source configured to illuminate a diagnostic area; a color image sensor configured to capture an image of the diagnostic area under illumination, the image comprising a plurality of samples in a plurality of color channels; and the image processing apparatus as described herein, configured to generate the endoscopic image for wireless transmission.

The at least one light source may comprise a wide spectrum light source or at least one narrow band light source.

The at least one light source may comprise a wide spectrum light source and at least one narrow band light source, and the apparatus may comprise a switch for selecting between the wide spectrum light source and the at least one narrow band light source.

The at least one light source may comprise a wide spectrum light source, and the apparatus may further comprise at least one narrow band color filter.

The at least one narrow band light source may comprise a green light source or a blue light source.

BRIEF DESCRIPTION OF THE DRAWINGS

A preferred embodiment of the present invention will now be described in detail with reference to the drawings, in which:

FIG. 1 illustrates an exemplary WCE system in accordance with at least some embodiments;

DESCRIPTION OF EXEMPLARY EMBODIMENTS

Figure 2A:
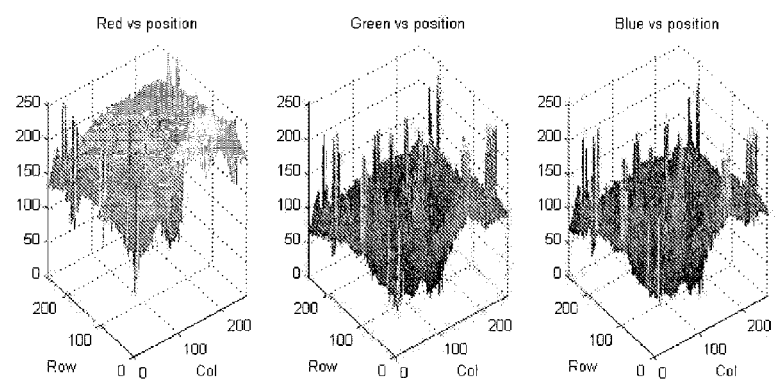
FIGS. 2A and 2B are 3D plots of RGB component values (i.e., red, green and blue) for the pixel positions of an image of both WBI and NBI endoscopic images.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as merely describing one or more exemplary implementations.

Recently, wireless capsule endoscopy (WCE) has been developed to capture images of the gastrointestinal tract for medical diagnostic purposes. In WCE, a capsule comprising an imaging device and a wireless transmitter is swallowed or ingested by the patient, whereupon the capsule transmits images periodically as the capsule passes through the patient's gastrointestinal tract. The transmitted images may be captured by an external device, for review by a medical practitioner. WCE is generally more comfortable for patients than wired endoscopy. Moreover, in contrast to wired endoscopy, a complete examination of the entire GI tract, including the small intestine, can be performed using this technique, which may be more difficult or even impossible with wired endoscopy techniques. WCE can be used to detect many diseases of the GI tract, such as bleeding, lesions, ulcers and tumours.

Referring now to FIG. 1, there is illustrated an exemplary WCE system. WCE system 100 comprises a WCE capsule 110, which itself generally comprises a digital image sensor 120 (optionally provided with a lens 115), a light source 125 for illuminating the GI tract so that image sensor 120 can capture images, an image processor 130, a battery 145, a wireless transmitter or transceiver 135 and an antenna 140. Transceiver 135 can be used to communicate with a transceiver 150 located external to the patient. Signals received by transceiver 150 can be communicated to and stored at a workstation 160, which may be a personal computer, for example.

As the WCE capsule must be swallowed by the patient, each of the elements of WCE capsule 110 must be limited in size to enable the WCE capsule to be compact. In particular, battery 145 must be kept small. Generally, battery 145 is operable to supply power to WCE capsule 110 for approximately 8 to 10 hours, in some cases longer, which can be sufficient for the WCE capsule 110 to traverse the GI tract of a patient. The size constraint of battery 145 and the need to supply power for the entirety of the WCE capsule's passage through the GI tract imposes a trade-off. In particular, the image processing and wireless transmission performed by WCE capsule 110 must be size and energy efficient, while maintaining sufficient image quality to enable accurate medical diagnosis.

Light source 125 can be a light emitting diode (LED), for example. When capturing endoscopic images, several changeable light modes can be used, such as white-band imaging (WBI), narrow-band imaging (NBI), and, in some cases, auto-fluorescence imaging (AFI). In WBI, broad spectrum light (e.g., white light) is used to illuminate the GI surface. In NBI, two or more discrete bands of light can be used. For example, in GI imaging, one blue and one green wavelength of light can be used (e.g., with center wavelengths at 415 nm and at 540 nm). Narrow band blue light can be suitable for displaying superficial capillary networks, while narrow band green light can be suitable for displaying subepithelial vessels. When the two are combined, a high contrast image of the tissue surface can be produced.

In some cases, light source 125 may comprise a plurality of light sources, which can be controlled remotely (e.g., from workstation 160) to switch between narrow and wide band imaging. For example, a remotely controlled switch may be provided to selectively switch a WBI light source and a NBI light source on and off, as needed.

In some other cases, a WBI light source can be used, and filters can be positioned in front of image sensor 120 to effect NBI lighting conditions. For example, the filters may be mechanically moved in and out of position using actuators provided at the WCE capsule (not shown). Alternatively, different color filters may cover different portions of image sensor 120, which may be activated or read from as needed.

To enable remote switching between WBI and NBI modes, transceiver 140 and transceiver 150 may be configured to provide duplex communication.

A WCE capsule generally traverses the GI tract via peristaltic contraction. Accordingly, images of clinically relevant and important tissues may be missed as the capsule is propelled over them. However, one or more techniques can be employed to ensure that relevant tissues are not missed. For example, a high sample rate (e.g., number of images per second) can be maintained, multiple imaging sensors can be used (e.g., oriented in different directions), and motility devices (e.g., miniature robotic arms) can be used. Each of these approaches increases the size and power requirements for the WCE capsule. Accordingly, the importance of efficient image processing and wireless transmission may be further increased.

Described herein are methods and apparatus for image processing suitable for use in a WCE capsule that may support one or both of the WBI and NBI modes.

The image processing methods and apparatus can be interfaced directly with commercially-available RGB image sensors that support the digital video port (DVP) interface, without the need for an intermediate buffer memory to fill blocks or frames (DVP devices generally output pixels in a raster scan fashion). The described image processing methods and apparatus can also be applied in other applications.

In contrast, conventional image processing and image compression techniques generally work on a block-by-block basis. For example, in image compression based on the Discrete Cosine Transform (DCT), 4×4 or 8×8 pixel blocks need to be accessed from the image sensor. Since commercial CMOS image sensors send pixels in a row-by-row fashion (and do not provide their own buffer memory), buffer memory needs to be provided to support such DCT-based algorithms.

For example, in order to start processing of the first 8×8 block of a 256×256 size image, the compressor must wait until the first 8×8 block is available, which means that seven full rows of the image, plus the first eight pixels of the eighth row must be received and stored (256×7+8=1800 pixels, assuming progressive scan). Hence, a 5.3 kB buffer memory may seem enough (assuming 24 bits per pixel for a color image). However, without a full size buffer memory (i.e., 192 kB to store the entirety of the 256×256 image), the image sensor output would need to be stopped (or paused) until the stored pixels are processed, otherwise no additional memory would be available to store new pixels. Alternatively, two parallel buffer memories of size 5.3 kB can be used, so that while the compressor works with pixels of one buffer, the new pixels continuously received from the image sensor can be stored in the other buffer. However, such an approach introduces timing challenges, juggling between the compression and input. Moreover, buffer memory can occupy significant area and consume power.

Beyond memory, the computational cost associated in such DCT-based algorithms, which involve multiplication, addition, data scheduling and other operations, can result in high area and power consumption.

Other compression algorithms such as LZW may require content addressable memory (CAM) to operate, as well as memory to store a coder dictionary.

The described methods and apparatus overcome many of the disadvantages of conventional image processing techniques when applied to wireless capsule endoscopy.

The described image processing is low complexity and thus consumes low power, conserving limited battery life while it travels through the GI tract. This enables the image resolution and frame rate (in frames per second or FPS) of the image sensor to be increased, for example. Other features, such as multi-camera imaging can also be enabled using the conserved power. Both WBI and NBI are supported, and the resulting processed images are sufficiently compressed to fit within the limited bandwidth of a medically implantable wireless transceiver. For example, the Zarlink ZL70081 is one wireless transmitter compatible with medical implant communication service (MICS), and supports a maximum data rate of 2.7 Mbps. The described image processing techniques can produce a target frame rate of at least 2-5 FPS.

Quality of the reconstructed image can be ensured, as the described image processing results in reconstructed images with a minimum peak signal-to-noise ratio (PSNR) of at least 35 dB. Similar satisfactory results occur with other evaluation criteria, such as structural similarity index (SSIM), visual information fidelity (VIF), and visual signal-to-noise ratio (VSNR).

Analysis of WBI and NBI images reveals endoscopic images generally exhibit dominance in red color components, and a relatively lower amount of green and blue components. Accordingly, a color conversion can be employed to take advantage of this characteristic by consolidating image information common to all three color channels in a single color channel.

In conventional image processing, luminance-chrominance (or luma-chroma) color spaces are used to take advantage of the human visual acuity system's sensitivity to changes in brightness and relative lack of sensitivity to changes in color.

In particular, due to the presence of relatively more rod cells (which are sensitive to brightness) than cone cells (sensitive to color), the human eye is more sensitive to small changes in brightness than to changes in color. Thus, the loss of information relating to changes in color (e.g., chrominance components) can be tolerated without dramatically degrading image quality.

One example of such a color space is the YUV color space, in which Y represents luminance and two chrominance components are represented by U and V. U represents the difference between the blue channel and luminance, while V represents the difference between the red channel and luminance.

However, conversion from the RGB color space, typically output by image sensors, and the YUV color space generally requires multiplication and the use of constants that are not powers of two. The use of such constants, and the resulting multiplication, necessitates the implementation of additional processing hardware, which in turn requires area and power.

Described herein is a color space conversion that does not rely on arbitrary constants or multiplication operations.

The described color space can be defined as YEF, in which a luminance component (i.e., luma) is represented by Y, a first chrominance component (chroma) is represented by E, and a second chrominance component is represented by F.

Generally, E may represent the difference between luminance and the green component (in short, chroma-E), and F may primarily represent the difference between luminance and the blue component (in short, chroma-F). These relationships are shown in Equations (1), (2) and (3).

$$Y = \frac{R}{4} + \frac{G}{2} + \frac{B}{4} \quad (1)$$

$$E = \frac{Y}{2} - \frac{G}{2} + 128 = \frac{R}{8} - \frac{G}{4} + \frac{B}{8} + 128 \quad (2)$$

$$F = \frac{Y}{2} - \left(\frac{3B}{8} + \frac{G}{8}\right) + 128 = \frac{R}{8} + \frac{G}{8} - \frac{B}{4} + 128 \quad (3)$$

From Equations (1), (2), and (3), it can be seen that the conversion between RGB and YEF color spaces involves only a few additions, negations and shift operations using the RGB components.

Figure 2B:
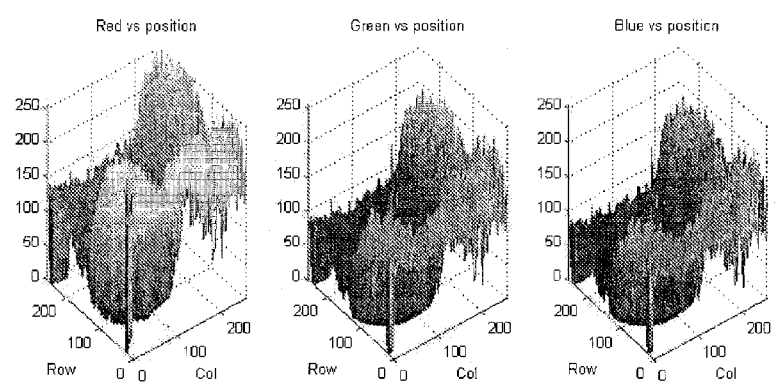

Referring now to FIGS. 2A and 2B, there are illustrated 3D plots of RGB component values (i.e., red, green and blue) for the pixel positions of an image of both WBI and NBI endoscopic images. The x- and y-axes correspond to row and column of each pixel, while the z-axis corresponds to the pixel value for each color.

It can be observed that, in the RGB color space, the changes in pixel values are high, and there is comparable information content in all three color components.

Figure 2C:
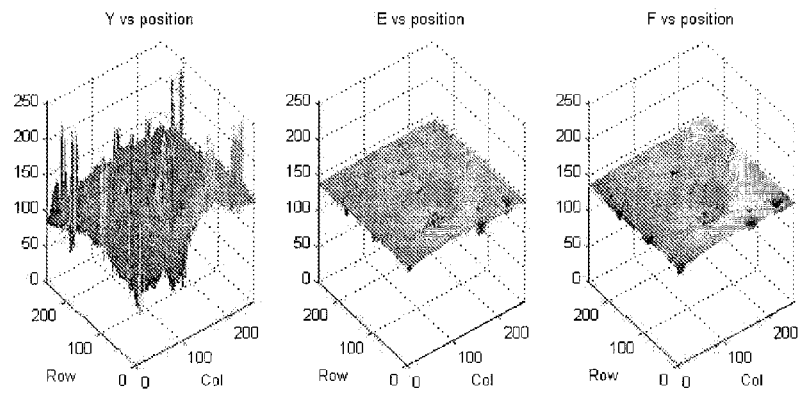
FIGS. 2C and 2D illustrate corresponding 3D plots of the same image of FIGS. 2A and 2B, with the equivalent YEF component values.
Figure 2D:
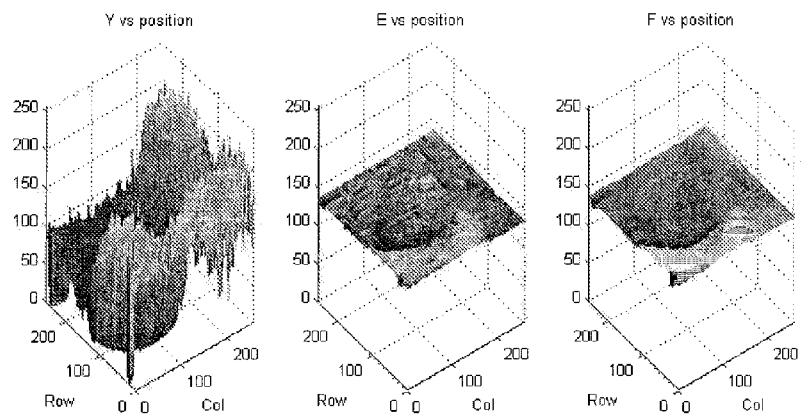

Referring now to FIGS. 2C and 2D, there are illustrated corresponding 3D plots of the same image of FIGS. 2A and 2B, with the equivalent YEF component values.

It can be observed that, in the YEF color space, there is less change in pixel values in the two chrominance components (E and F), which indicates that the E and F components contain less information.

Through experimentation, it has been determined that the intensity distribution of the green component in RGB endoscopic images is very similar to that of the blue component (as can be seen in FIGS. 2A and 2B). It has been further determined that the intensity distribution of luminance (Y) is similar to the intensity distribution of green and blue RGB components. Accordingly, subtracting green and blue components from the luminance component can produce differential pixel values that are generally small and exhibit little entropy.

TABLE 1

| Color space | | WBI StdDev | NBI StdDev | WBI Entropy | NBI Entropy |
|---|---|---|---|---|---|
| RGB | R | 46.6 | 44.1 | 7.1 | 7.2 |
|  | G | 39.4 | 39.6 | 7.0 | 7.0 |
|  | B | 34.7 | 36.1 | 6.7 | 6.9 |
| YUV | Y | 34.3 | 34.6 | 6.8 | 6.8 |
|  | U | 7.0 | 3.0 | 4.4 | 3.2 |
|  | V | 9.6 | 5.6 | 4.9 | 4.1 |
| YCoCg | Y | 38.8 | 39.5 | 7.0 | 7.0 |
|  | Co | 13.9 | 7.0 | 5.5 | 4.5 |
|  | Cg | 5.3 | 3.3 | 4.1 | 3.6 |
| YEF | Y | 38.8 | 39.5 | 7.0 | 7.0 |
|  | E | 2.7 | 1.7 | 3.2 | 2.6 |
|  | F | 4.7 | 2.1 | 3.9 | 2.8 |

Table 1 illustrates the average standard deviation and entropy for each of the components of several color spaces, for a plurality of both WBI and NBI exemplary endoscopic images. It can be observed that the YEF color space has the lowest standard deviation and entropy in its chroma components. The low entropy suggests the YEF color space should be subject to good compression.

Figure 3A:
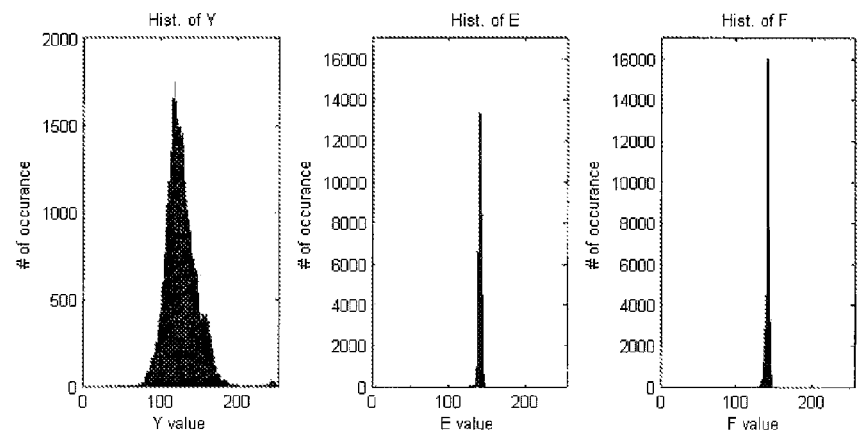
FIGS. 3A and 3B are histograms for a WBI and an NBI endoscopic image, respectively, following conversion into the YEF color space.
Figure 3B:
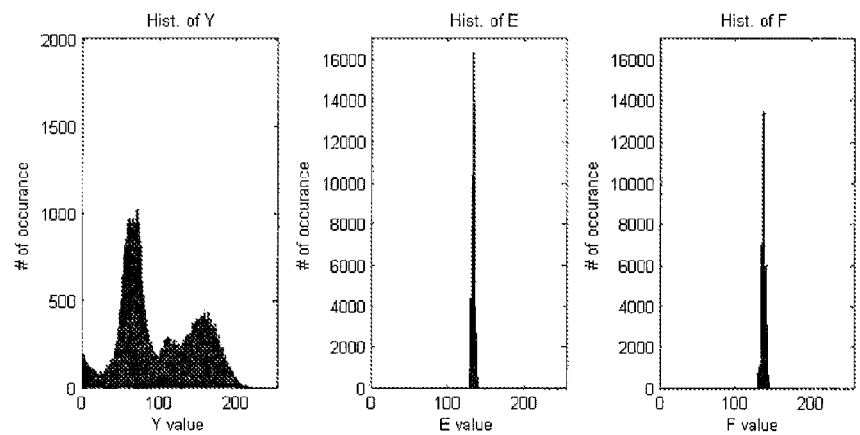

Referring now to FIGS. 3A and 3B, there are illustrated the histograms for a WBI and an NBI endoscopic image, respectively, following conversion into the YEF color space.

It can be observed that the variations of the E and F are relatively narrow, due in part to the color homogeneity of the endoscopic images. Accordingly, in some embodiments, subsampling of the chroma components can be employed to reduce the amount of information that is to be compressed and transmitted.

Figure 4:
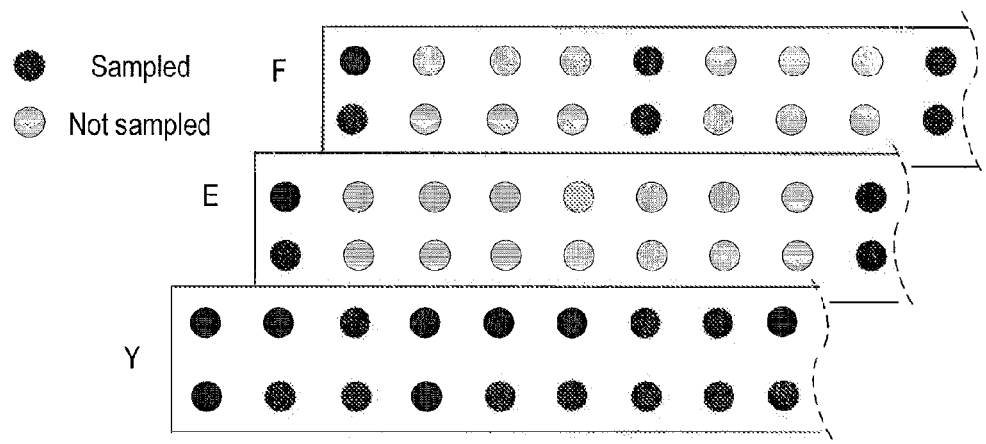
FIG. 4 illustrates a YEF812 subsampling scheme.

Subsampling can be performed, for example, by selecting one out of every $n^{th}$ pixel to be encoded. For example, in one subsampling scheme, defined as YEF811, for every eight Y component samples, one E component sample and one F component sample are used. In another example scheme, defined as YEF812, for every eight Y component samples, one E component sample and two F component samples are used. The YEF812 subsampling scheme is illustrated in FIG. 4.

The effect of various subsampling schemes on the quality of exemplary reconstructed WBI endoscopic images, as determined by various quality metrics, is shown in Table 2.

TABLE 2

|  | Luminance | | | Chroma | |
| --- | --- | --- | --- | --- | --- |
|  | SSIM | VIF | PSNR | VSNR | PSNR(E) | PSNR(F) |
| YEF888 | 0.999 | 0.988 | 57.3 | 58.0 | 60.2 | 60.5 |
| YEF422 | 0.998 | 0.986 | 57.0 | 55.5 | 57.8 | 58.9 |
| YEF412 | 0.998 | 0.984 | 56.5 | 54.7 | 54.6 | 58.8 |
| YEF814 | 0.998 | 0.977 | 55.3 | 52.5 | 51.0 | 58.3 |
| YEF822 | 0.998 | 0.978 | 55.9 | 53.2 | 54.6 | 55.0 |
| YEF812 | 0.998 | 0.972 | 54.7 | 51.4 | 51.0 | 54.8 |
| YEF811 | 0.998 | 0.957 | 53.6 | 46.1 | 51.0 | 50.4 |
| YEF16.1.2 | 0.997 | 0.952 | 52.3 | 43.9 | 47.9 | 50.4 |

The effect of various subsampling schemes on the quality of exemplary reconstructed NBI endoscopic images, as determined by various quality metrics, is shown in Table 3.

TABLE 3

|  | Luminance | | | Chroma | |
| --- | --- | --- | --- | --- | --- |
|  | SSIM | VIF | PSNR | VSNR | PSNR(E) | PSNR(F) |
| YEF888 | 0.998 | 0.989 | 57.1 | 69.2 | 60.7 | 60.0 |
| YEF422 | 0.998 | 0.989 | 57.1 | 66.2 | 58.3 | 59.2 |
| YEF412 | 0.998 | 0.988 | 57.0 | 66.2 | 55.1 | 59.2 |
| YEF814 | 0.998 | 0.987 | 56.9 | 66.2 | 51.8 | 59.1 |
| YEF822 | 0.998 | 0.986 | 56.7 | 66.4 | 55.1 | 56.7 |
| YEF812 | 0.998 | 0.985 | 56.8 | 66.5 | 51.8 | 56.7 |
| YEF811 | 0.998 | 0.980 | 56.5 | 59.4 | 51.8 | 53.5 |
| YEF16.1.2 | 0.998 | 0.978 | 56.5 | 59.3 | 49.4 | 53.5 |
| YEF16.1.1 | 0.998 | 0.973 | 56.2 | 52.1 | 49.4 | 50.9 |

It can be seen from Table 2 and Table 3 that the YEF888 scheme yields the best performance, which is to be expected as no sub-sampling is performed. For WBI images, the YEF16.1.2 scheme (in which, for every 16 Y components, one E and two F components are taken) produces the poorest result, due to heavier sub-sampling. In the case of NBI images, it is YEF16.1.1 that exhibits the poorest results in the above table.

In the examples above, the YEF814, YEF822, and YEF812 schemes may offer a suitable trade-off between compression ratio and image quality for the WBI mode, for example.

A further characteristic of endoscopic images is that changes between adjacent pixel values are generally small. In general, component values tend to change gradually and slowly, as sharp edges are rare in endoscopic images. The change in component values (dX) with respect to its adjacent left pixel in any row can be expressed by Equation (4):

$$dX_{r,c} = X_{r,c} - X_{r,c-1} \quad (4)$$

where, $X_{r,c}$ is the pixel value at row r and column c, and $X_{r,c-1}$ is its adjacent left pixel value. In this example, X can refer to Y, E, or F component values.

Figure 5:
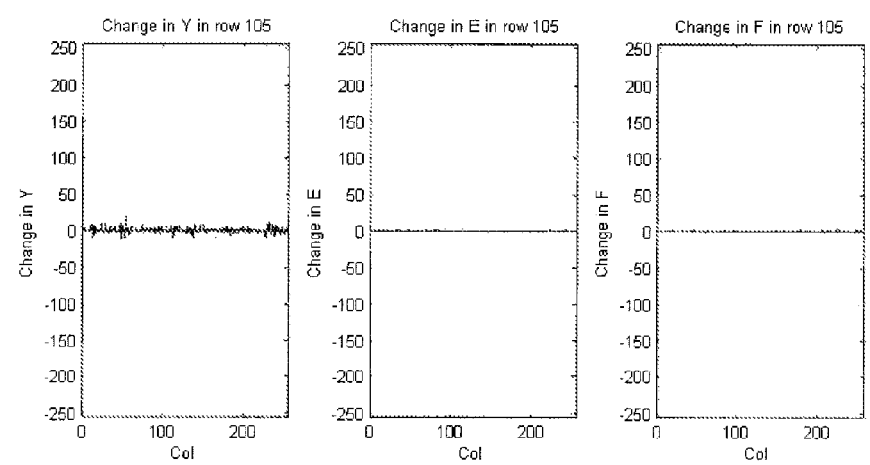
FIG. 5 illustrates the change in dX for an endoscopic image, in all three YEF components.

Referring now to FIG. 5, there is illustrated the change in dX for an endoscopic image, in all three YEF components.

As noted above, the difference in pixel (dX) with respect to the adjacent left pixel is found to be small in endoscopic images. As a result, a form of differential pulse code modulation (DPCM) may be used in some embodiments to encode the pixel values efficiently. DPCM is a lossless encoding scheme with little computational complexity.

Figure 6:
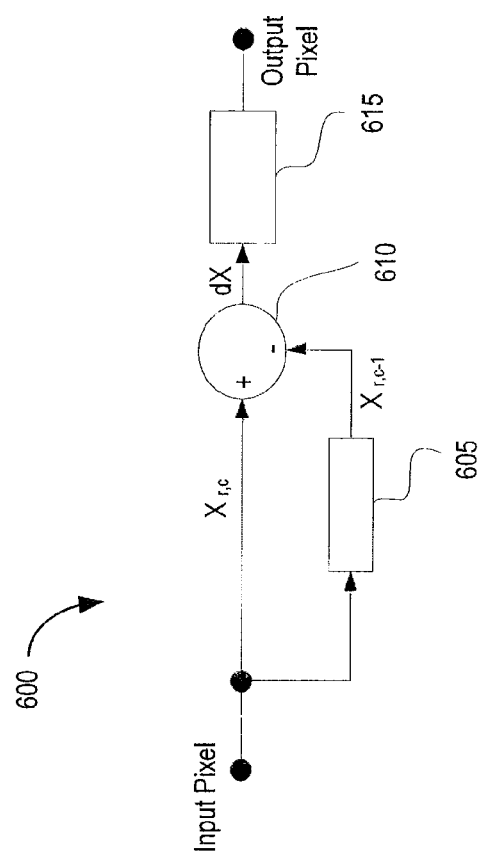
FIG. 6 is a simplified block diagram of an exemplary DPCM encoder.

Referring now to FIG. 6, there is illustrated a block diagram of an exemplary DPCM encoder. DPCM encoder 600 comprises a prediction module 605, an addition/subtraction module 610 and a symbol encoder 615.

Prediction module 605 algorithmically selects a predicted next pixel value based on an input pixel (and, optionally, one or more previous input pixels). The predicted pixel value is subtracted from the input pixel value at 610 and the difference dX is encoded for transmission by symbol encoder 615.

One form of DPCM that may be used in some embodiments is a JPEG lossless prediction mode. In particular, JPEG lossless prediction mode-1 (e.g., left pixel prediction) can be used, as it can be efficiently implemented in hardware and is suitable for processing raster scanned pixels without the requirement for a buffer memory.

Further compression of DPCM-encoded data can be performed through the use of a suitable variable-length encoding scheme. Such variable-length encoding may also incorporate error correction or detection aspects.

Figure 7A:
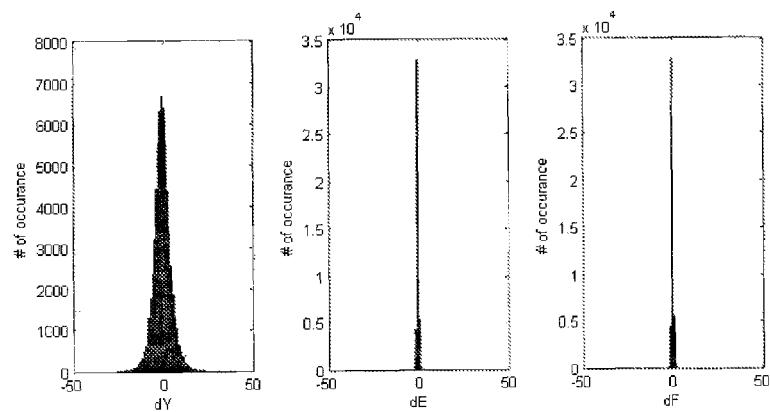
FIGS. 7A and 7B are histograms of dY, dE and dF of exemplary WBI and NBI endoscopic images, respectively.
Figure 7B:
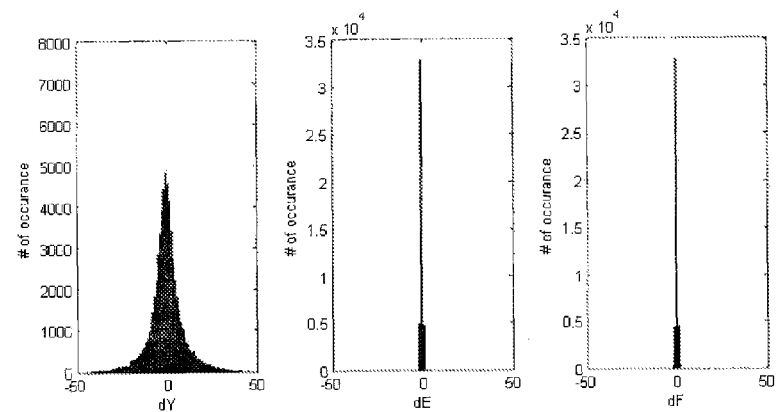

Referring now to FIGS. 7A and 7B, there are illustrated histograms of dY, dE and dF of exemplary WBI and NBI endoscopic images, respectively. The histograms demonstrate what is generally a two-sided geometric distribution.

For geometric distributions, Golomb coding can be used to provide an optimum code length.

For the purposes of hardware efficiency and ease of implementation, Golomb-Rice coding may be used as an alternative to Golomb coding, as the former exhibits similar compression efficiency to the latter.

Golomb-Rice coding uses positive integers, however dX can be positive or negative. Accordingly, the values of dX can be mapped to m_dX using Equation (5):

$$\text{m\_dX} = \begin{cases} 2dX, & \text{when } dX \geq 0 \\ 2|dX| - 1, & \text{when } dX < 0 \end{cases} \quad (5)$$

Experimental verification indicates that the values of dY generally fall in the range between +127 and −128, in part due to the absence of sharp transitions between two consecutive pixels in endoscopic images. Moreover, dE and dF values generally fall within an even narrower range. Accordingly, integers in m_dX can be mapped to the range between 0 and 255, which can be expressed in binary form using eight bits.

An optimized Golomb-Rice coding scheme can be defined as follows:

$$I = 2^8 = 256 \quad (6)$$

$$M = 2^k \quad (7)$$

Where M is a predefined integer and a power of 2, then m_dX can divided by M as follows:

$$q = \text{Integer}\left(\frac{\text{m\_dX}}{M}\right) \quad (8)$$

$$r = \text{m\_dx} \bmod M \quad (9)$$

The quotient q can be expressed in unary in q+1 bits. The remainder r can be concated with the unary code, and r expressed in binary in k bits.

Generally, length of the Golomb-Rice code can be limited by using a parameter $g_{limit}$. In particular, if:

$$q \geq g_{limit} - \log_2 I - 1 \quad (10)$$

then the unary code of $g_{limit} - \log_2 I - 1$ can be prepared. This can be used as an "escape code" for the decoder, and can be followed by the binary representation of m_dX in $\log_2 I$ bits.

The length of a golomb-rice code can be calculated using (11) and (12):

$$j = g_{limit} - \log_2 I - 1 \quad (11)$$

$$\text{gr\_len} = \begin{cases} q + 1 + k, & \text{when } q < j \\ g_{limit}, & \text{when } q \geq j \end{cases} \quad (12)$$

The maximum length of the Golomb-Rice code ($g_{limit}$) can be selected to be, for example, 32.

Figure 8:
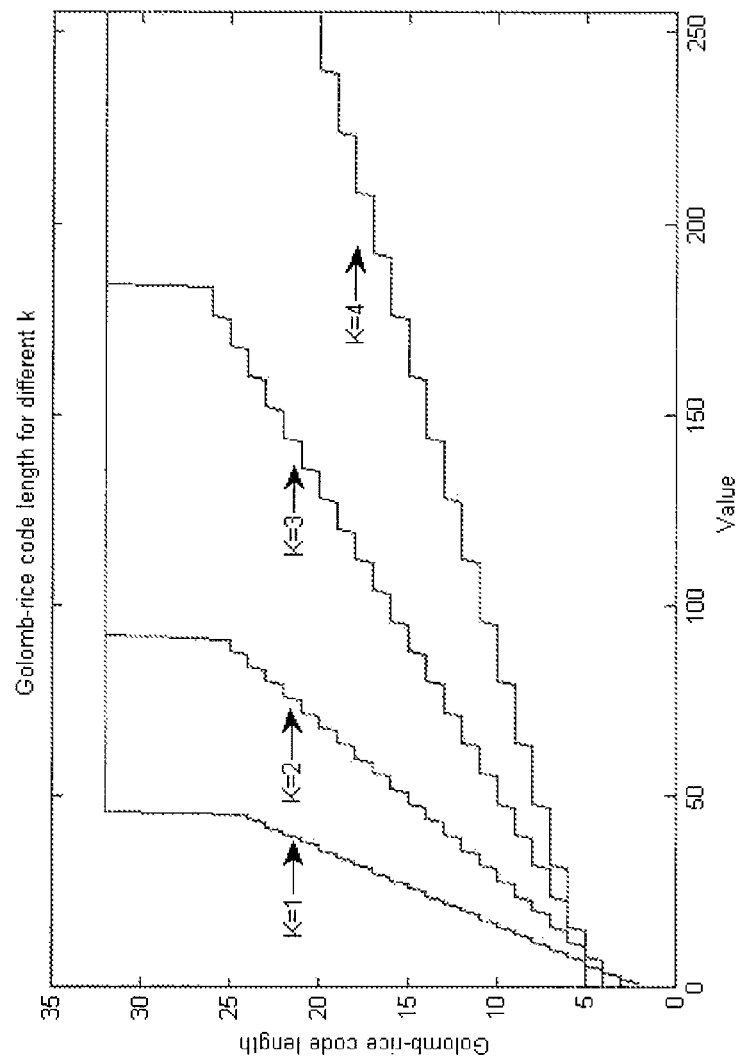
FIG. 8 is a plot showing the length of Golomb-Rice codes for various integer values.

Referring now to FIG. 8, there is illustrated a plot showing the length of Golomb-Rice codes for various integer values, as a function of k. From the histograms of FIGS. 7A and 7B, it can be observed that the most frequently occurring value of dE and dF is 0, followed by other values close to zero. Generally, smaller length codes for zero and near-zero values can be assigned to facilitate good compression. Accordingly, k=1 can be selected for encoding the mapped integers for dE and dF.

Since dY generally spans a wider range of values in NBI images than in WBI images (e.g., due to the presence of sharper edges), the k parameter can be selected differently depending on use case. Exemplary k parameters are illustrated in Table 4.

TABLE 4

|     | m_dY | m_dE | m_dF |
|-----|------|------|------|
| WBI | 2    | 1    | 1    |
| NBI | 3    | 1    | 1    |

Generally, in wireless endoscopy, the image sensor may be encased in a capsule-shaped tube. Due to the generally rounded shape of the capsule, corner areas in a captured image may be distorted (e.g., stretched) and thus less reliable for diagnostic purposes. When such areas can be safely disregarded, additional compression can be gained by clipping the distorted areas.

From the implementation point of view, it is generally easier to clip four corners of an image along a straight diagonal line, rather than applying a radial cut. The diagonal line can be chosen to encompass the radial line that might otherwise be desired, and some small additional number of pixels. Clipping is not limited to one or more corners. In other embodiments, other areas of the image may be discarded (e.g., center portion of the image) according to various geometries.

However, if corner clipping is applied, once the horizontal and vertical length of the corner cut is determined, a clipping technique can be implemented with relatively few combinational logic blocks.

For example, column and row pixel positions can be identified to determine whether they fall within a desired viewing region. If the pixel is within the viewing region, it can be sampled, otherwise, the pixel may be ignored or discard (e.g., not sampled).

Figure 9:
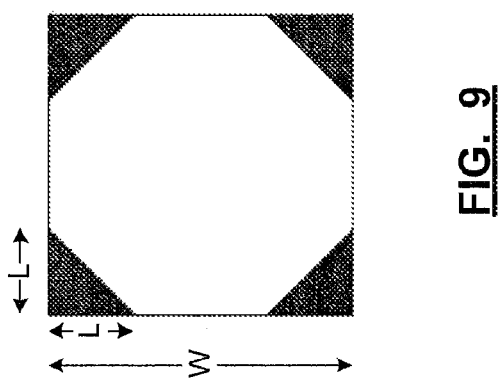
FIG. 9 illustrates an example of an image with corner clipping applied.

FIG. 9 illustrates an example of an image with corner clipping applied, in which the areas shaded in black represent clipped pixels.

Once L is determined as shown in FIG. 9, it is simple to implement the clipping algorithm in hardware with just a few combinational logic blocks. As seen from the pseudo code below, the column and row pixel positions are checked to see whether they fall into the desired visual region; if the position is inside, it is sampled; if not, the pixel is ignored (i.e., not sampled).

```
Is_inside_visual_area := False
If ( cY < L ) {
    If cX >=(L-cY) And cX <(W-(L-cY))
        Is_inside_visual_area := True }
Else if cY >= (W - L) {
    If cX >=((cY-(W-L))+1) And cX<(W-((cY-(W-
        L))+1))
        Is_inside_visual_area := True }
Else
    Is_inside_visual_area := True
```

Figure 10:
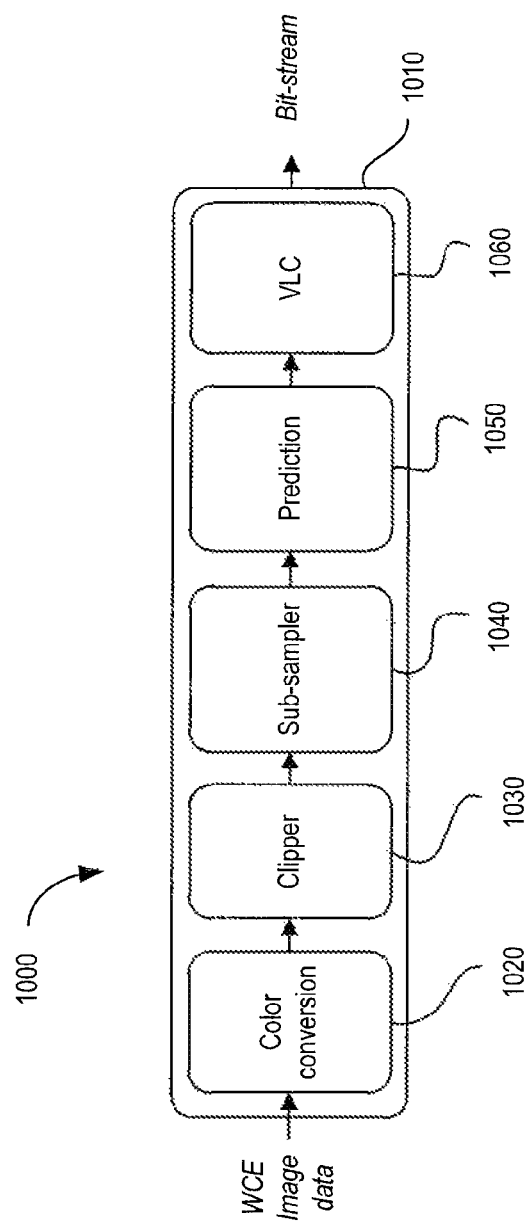
FIG. 10 is a simplified block diagram of an exemplary image processor in accordance with at least some embodiments.

Referring now to FIG. 10, there is illustrated a simplified block diagram of an exemplary image processor in accordance with at least some embodiments.

Image processor 1000 generally comprises a color conversion module 1020, a clipper 1030, a subsampler 1040, a predictive encoder 1050 and a variable length coder 1060. Image processor 1000 may be implemented as a hardware processor, such as an application specific integrated circuit (ASIC), in a field programmable gate array (FPGA) device, or the like. In some cases, image processor 1000 may be implemented as software instructions stored on a non-transitory computer readable medium, wherein the software instructions, when executed by a general purpose processor, cause the processor to perform the described functions. In some embodiments, portions of image processor 1000 may be implemented in software and other portions implemented in hardware.

Color conversion module 1020 may receive image data, for example from an image sensor of a WCE capsule, and convert from a first color space to a second color space. For example, color conversion module 1020 may convert RGB pixel data to the YEF color space, according to Equations (1), (2) and (3). Accordingly, color conversion module 1020 may be configured to generate a luma channel based on the plurality of RGB color channels, generate a first chroma channel based on a difference between the luma channel and a first color channel in the plurality of color channels (e.g., green component), and generate a second chroma channel based on a difference between the luma channel and a second color channel in the plurality of color channels (e.g., blue).

Each sample value of the luma channel may be generated using addition and shift operations. Similarly, each sample value of the chroma channels may be generated using addition, negation and shift operations, as described herein.

Moreover, each sample value of the luma channel may be generated based on a summation of corresponding sample values in the plurality of color channels, as described herein. The summation may be of: a first color channel sample value bitshifted once to divide by two; a second color channel sample value bitshifted twice to divide by four; and a remaining color channel sample value bitshifted twice to divide by four.

Correspondingly, the difference between the luma channel and the first color channel may be computed based on: the luma sample value bitshifted once to divide by two; and the first color channel sample value bitshifted once to divide by two. Similarly, the difference between the luma channel and the second color channel may be computed by: computing a sum of the first color channel sample value and the remaining color channel sample value, bitshifting the sum three times to divide by eight, and subtracting from the bitshifted sum the second color channel sample value bitshifted twice to divide by four.

The first and second color channels can be selected to correspond to colors other than a dominant color in the image (e.g., red, for endoscopic images).

Optionally, YEF image data may be provided to clipper 1030, which may clip at least one portion of the image according to a clipping algorithm, as described herein. In some embodiments, clipping may be performed on RGB image data, prior to conversion into the YEF color space.

Optionally, the YEF image data may be provided to subsampler 1040, which may subsample YEF image data according to one or more selected subsampling schemes. For example, subsampler 1040 may be configured to subsample the YEF image data according to a YEF812 scheme. Accordingly, subsampler 1040 may subsample the first chroma channel relative to the luma channel, or subsample the second chroma channel relative to the luma channel.

YEF image data may further be provided to predictive encoder 1050, which may be a DPCM encoder, a JPEG lossless predictive coder. In some cases, predictive encoder 1050 may employ left pixel prediction based on JPEG lossless predictive coding mode-1.

Image data encoded by predictive encoder 1050 may further be provided to variable length coder 1010, which may be a Golomb-Rice encoder, for example, as described herein.

Following variable length coding, the image data may be output to produce a processed image, e.g., for transmission by a WCE capsule transceiver.

Some components have been omitted so as not to obscure description of the exemplary embodiments. For example, a parallel to serial converter (P2S) may be provided at the output of image processor 1000, to format output data into serial data suitable for wireless transmission.

Experimental implementation and verification of image processor 1000 indicates that an average compression ratio (using a YEF812 sub-sampling scheme) is 80.4% for a WBI image and 79.2% for a NBI image, with an average PSNR of 43.7 dB. Accordingly, resultant images of a QVGA resolution can be transmitted at a frame rate of 5 FPS in the experimental implementation.

Figure 11:
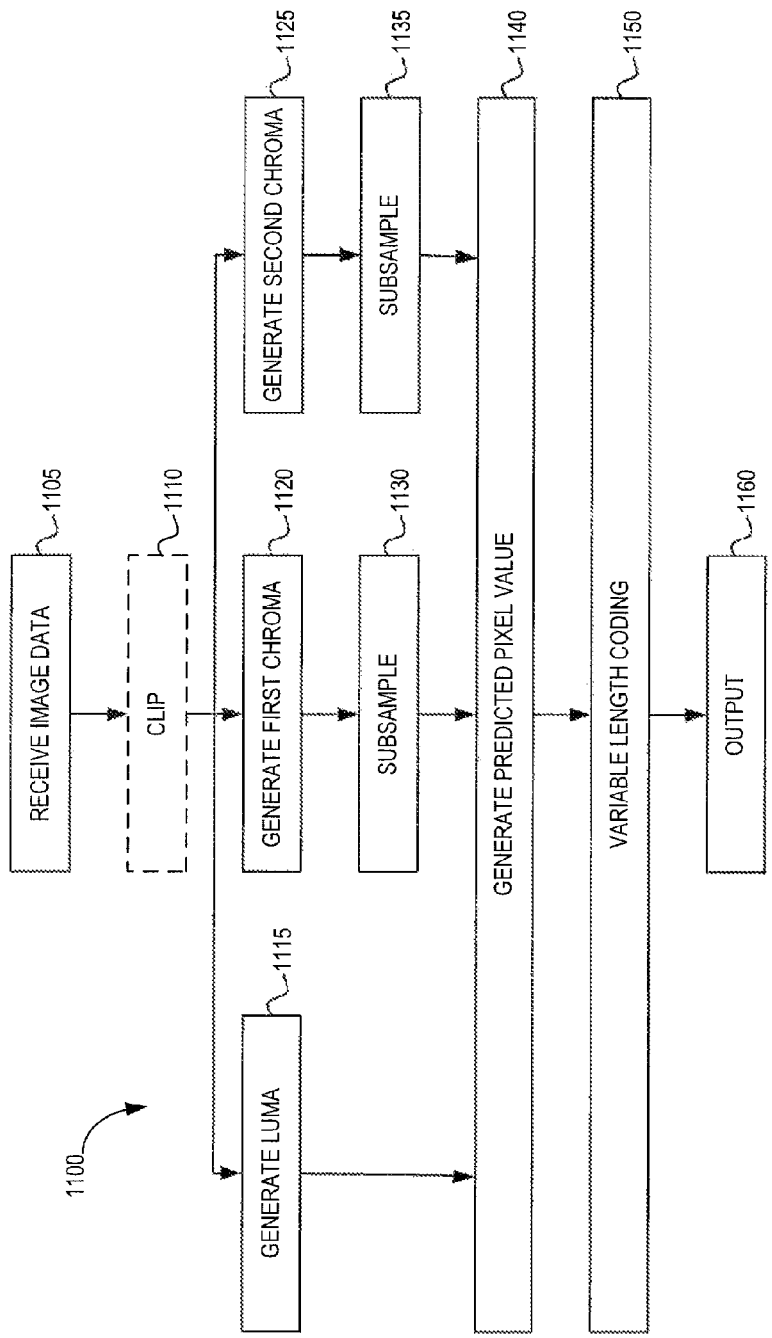
FIG. 11 is a flow diagram for an exemplary method of processing an image captured using a color image sensor.

Referring now to FIG. 11, there is illustrated a flow diagram for an exemplary method of processing an image captured using a color image sensor, in accordance with at least some embodiments.

Method 1100 begins with receiving image data from an image sensor at 1105. In some cases, the image sensor may be an RGB image sensor and the image data may be RGB image data.

Optionally, at 1110, the image data may be clipped, for example by clipper 1030. Alternatively, image data may be clipped following conversion to the YEF color space.

At 1115, a luma channel in the YEF color space may be generated from the RGB image data, for example by color conversion module 1020, as described herein.

At 1120, a first chroma channel may be generated from the RGB image data, for example by color conversion module 1020, as described herein. Similarly, a second chroma channel may be generated from the RGB image data at 1125.

Optionally, the first chroma channel image data may be subsampled at 1130, for example by subsampler 1040, as described herein. Similarly, the second chroma channel image data optionally may be subsampled at 1135.

At 1140, a plurality of difference values between the plurality of predicted sample values and the respective generated sample values may be computed, for example by predictive encoder 1050, as described herein.

At 1150, the plurality of difference values may be variable length encoded, for example by variable length coder 1060, as described herein.

Image data may be output at 1160 to be transmitted wirelessly, for example.

Figure 12:
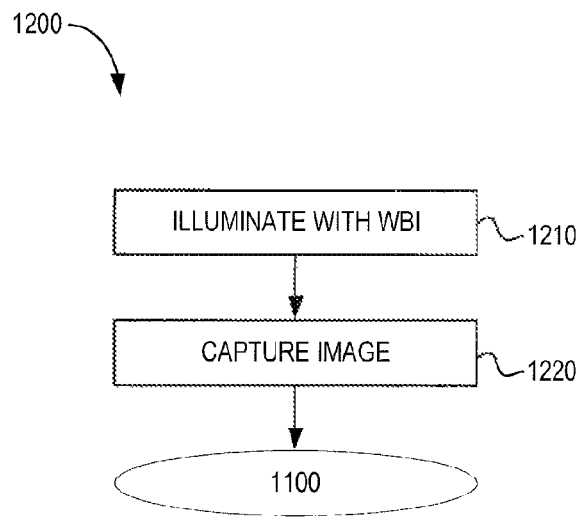
FIG. 12 is a flow diagram for an exemplary method of generating an endoscopic image for wireless transmission.

Referring now to FIG. 12, there is illustrated a flow diagram for an exemplary method of generating an endoscopic image for wireless transmission, in accordance with at least some embodiments.

Method 1200 begins at 1210, by illuminating a diagnostic area, for example a GI tract of a patient, using a light source, such as light source 125. In particular, the light source may be a wide spectrum light source, producing white light.

At 1220, an image of the diagnostic area is captured using an image sensor, such as image sensor 120.

Upon capturing the image, method 1200 may process the image, for example by proceeding to 1105 of method 1100.

Figure 13:
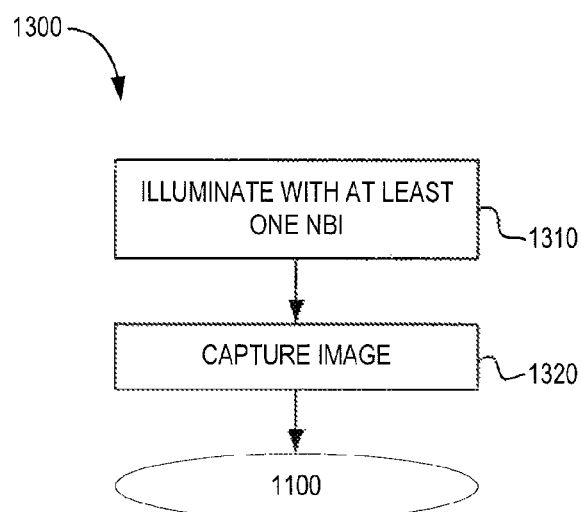
FIG. 13 is a flow diagram for another exemplary method of generating an endoscopic image for wireless transmission.

Referring now to FIG. 13, there is illustrated a flow diagram for another exemplary method of generating an endoscopic image for wireless transmission, in accordance with at least some embodiments.

Method 1300 begins at 1310, by illuminating a diagnostic area, for example a GI tract of a patient, using a light source, such as light source 125. In particular, the light source may comprise at least one narrow band light source, as described herein. The narrow band light source may, for example, produce green or blue light.

At 1320, an image of the diagnostic area is captured using an image sensor, such as image sensor 120.

Upon capturing the image, method 1300 may process the image, for example by proceeding to 1105 of method 1100.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

We claim:

1. A method of generating an endoscopic image for wireless transmission, the method comprising:

illuminating a diagnostic area using at least one light source;

capturing, using a color image sensor, an image of the diagnostic area under illumination, the image comprising a plurality of samples in a plurality of color channels;

generating a luma channel based on the plurality of color channels;

generating a first chroma channel based on a difference between the luma channel and a first color channel in the plurality of color channels;

generating a second chroma channel based on a difference between the luma channel and a second color channel in the plurality of color channels;

generating, using a processor, a plurality of predicted sample values for the luma channel and the first and second chroma channels using a lossless predictive coding mode;

computing a plurality of difference values between the plurality of predicted sample values and the respective generated sample values; and variable length coding the plurality of difference values to produce a processed image.

2. The method of claim 1, wherein the at least one light source comprises a wide spectrum light source and at least one narrow band light source, and further comprising switching between the wide spectrum light source and the at least one narrow band light source.

3. The method of claim 1, wherein the at least one light source comprises a wide spectrum light source, further comprising switching between a wide spectrum imaging mode and a narrow band imaging mode.

4. An apparatus for generating an endoscopic image for wireless transmission, the apparatus comprising:
   at least one light source configured to illuminate a diagnostic area;
   a color image sensor configured to capture an image of the diagnostic area under illumination, the image comprising a plurality of samples in a plurality of color channels;
   a color conversion module configured to:
      generate a luma channel based on the plurality of color channels;
      generate a first chroma channel based on a difference between the luma channel and a first color channel in the plurality of color channels; and
      generate a second chroma channel based on a difference between the luma channel and a second color channel in the plurality of color channels;
   a predictive encoder configured to:
      generate a plurality of predicted sample values for the luma channel and the first and second chroma channels using a lossless predictive coding mode; and
      compute a plurality of difference values between the plurality of predicted sample values and the respective generated sample values; and
   a variable length coder configured to encode the plurality of difference values to produce a processed image.

5. The apparatus of claim 4, wherein the at least one light source comprises a wide spectrum light source and at least one narrow band light source, and further comprising a switch for selecting between the wide spectrum light source and the at least one narrow band light source.

6. The apparatus of claim 4, wherein the at least one light source comprises a wide spectrum light source, further comprising at least one narrow band color filter.

7. The method of claim 1, wherein the diagnostic area is illuminated with a wide spectrum light source.

8. The method of claim 1, wherein the diagnostic area is illuminated with at least one narrow band light source.

9. The method of claim 8, wherein the at least one narrow band light source comprises a green light source or a blue light source.

10. The method of claim 1, wherein each sample value of the luma channel is generatable using addition and shift operations.

11. The method of claim 1, wherein each sample value of the first and second chroma channels is generatable using addition, negation and shift operations.

12. The method of claim 1, wherein the image comprises a dominant color, and wherein the first and second color channels correspond to colors other than the dominant color.

13. The method of claim 1, further comprising subsampling at least one of the first chroma channel and the second chroma channel relative to the luma channel prior to generating the plurality of predicted sample values.

14. The method of claim 1, further comprising clipping at least one portion of the image prior to generating the plurality of predicted sample values.

15. The method of claim 1, wherein the plurality of difference values are variable length coded using Golomb-Rice coding.

16. The method of claim 1, wherein the lossless predictive coding mode is a JPEG lossless predictive coding mode.

17. The apparatus of claim 4, wherein the at least one light source comprises a wide spectrum light source.

18. The apparatus of claim 4, wherein the at least one light source comprises at least one narrow band light source.

19. The apparatus of claim 18, wherein the at least one narrow band light source comprises a green light source.

20. The apparatus of claim 18, wherein the at least one narrow band light source comprises a blue light source.

* * * * *